US012617040B2

(12) United States Patent
Sepp et al.

(10) Patent No.: US 12,617,040 B2
(45) Date of Patent: May 5, 2026

(54) METHOD FOR DETERMINING A MINIMUM WIDTH AND AN ATTACHMENT POSITION OF A MICROJOINT AND METHOD FOR MACHINING A WORKPIECE

(71) Applicant: TRUMPF Werkzeugmaschinen SE + Co. KG, Ditzingen (DE)

(72) Inventors: Florian Sepp, Bernbeuren (DE); Simon Ockenfuss, Renningen (DE); Patrick Mach, Korb (DE); Kai Etzel, Besigheim (DE); Christoph Weiss, Schongau (DE)

(73) Assignee: TRUMPF Werkzeugmaschinen SE + Co. KG, Ditizjngen (DE)

( * ) Notice: Subject to any disclaimer, the term of this patent is extended or adjusted under 35 U.S.C. 154(b) by 786 days.

(21) Appl. No.: 17/981,637

(22) Filed: Nov. 7, 2022

(65) Prior Publication Data

US 2023/0054278 A1     Feb. 23, 2023

Related U.S. Application Data

(63) Continuation of application No. PCT/EP2021/061767, filed on May 5, 2021.

(30) Foreign Application Priority Data

May 6, 2020     (DE) .................... 10 2020 205 680.3

(51) Int. Cl.
B23K 26/38 (2014.01)

(52) U.S. Cl.
CPC .................................... B23K 26/38 (2013.01)

(58) Field of Classification Search
CPC ................................. B23K 26/38; B23K 26/00
USPC ...................................................... 219/121.72
See application file for complete search history.

(56) References Cited

U.S. PATENT DOCUMENTS

| | | | | | |
|---|---|---|---|---|---|
| 4,317,023 | A | * | 2/1982 | Gryskiewicz ......... | E21B 43/086 166/227 |
| 5,577,312 | A | * | 11/1996 | Seto .......................... | B26F 1/14 29/418 |
| 5,688,418 | A | * | 11/1997 | Yoshiyasu ............ | B23K 26/389 219/121.72 |
| 5,767,479 | A | * | 6/1998 | Kanaoka ................ | B23K 26/60 219/121.72 |

(Continued)

FOREIGN PATENT DOCUMENTS

| | | |
|---|---|---|
| CN | 102905841 A | 1/2013 |
| CN | 105848802 A | 8/2016 |

(Continued)

*Primary Examiner* — Jimmy Chou
(74) *Attorney, Agent, or Firm* — Laurence A. Greenberg; Werner H. Stemer; Ralph E. Locher

(57) ABSTRACT

A method for determining a minimum width of a microjoint by which, when machining a workpiece, in particular a sheet-like workpiece, a workpiece part remains connected to a remaining workpiece of the workpiece. In the method, the minimum width of the microjoint is determined in dependence on at least one machining parameter which influences a relative position of the workpiece part in relation to the remaining workpiece during the machining of the workpiece. A further method determines an attachment position of such a microjoint and a still further method machines the workpiece.

14 Claims, 2 Drawing Sheets

(56)  References Cited

U.S. PATENT DOCUMENTS

| | | | | | |
|---|---|---|---|---|---|
| 5,777,294 | A | * | 7/1998 | Sugahara | B23K 26/08 |
| | | | | | 219/121.72 |
| 6,084,223 | A | * | 7/2000 | Dietz | B23K 26/032 |
| | | | | | 219/121.64 |
| 6,125,520 | A | * | 10/2000 | Lindsey | B23D 31/002 |
| | | | | | 83/917 |
| 7,490,501 | B2 | | 2/2009 | Endo | |
| 9,981,345 | B2 | | 5/2018 | Matsumoto | |
| 11,364,574 | B2 | | 6/2022 | Bader | |
| 2003/0209528 | A1 | * | 11/2003 | Choo | B28D 5/00 |
| | | | | | 219/121.72 |
| 2009/0250445 | A1 | * | 10/2009 | Yamaguchi | G05B 19/404 |
| | | | | | 219/121.72 |
| 2010/0200552 | A1 | * | 8/2010 | Mienhardt | B23K 26/38 |
| | | | | | 219/121.72 |
| 2013/0068738 | A1 | * | 3/2013 | Schurmann | B23K 26/03 |
| | | | | | 219/121.72 |
| 2013/0319980 | A1 | * | 12/2013 | Hesse | B23K 26/032 |
| | | | | | 219/121.62 |
| 2016/0288257 | A1 | * | 10/2016 | Deiss | B23K 26/38 |
| 2019/0111516 | A1 | * | 4/2019 | Meyer | B23K 37/0235 |
| 2019/0247960 | A1 | * | 8/2019 | Mienhardt | G01N 21/8851 |
| 2020/0001401 | A1 | | 1/2020 | Jin et al. | |
| 2020/0009688 | A1 | * | 1/2020 | Chainur | B23K 26/1462 |
| 2021/0078110 | A1 | * | 3/2021 | Mienhardt | B23K 26/032 |
| 2022/0152744 | A1 | * | 5/2022 | Sepp | B23K 26/361 |

FOREIGN PATENT DOCUMENTS

| | | | | | |
|---|---|---|---|---|---|
| CN | 109862990 | A | | 6/2019 | |
| DE | 102012212566 | B4 | | 2/2014 | |
| DE | 102014200208 | B3 | | 6/2015 | |
| DE | 102015105246 | A1 | * | 10/2016 | B23K 26/0853 |
| DE | 102017213394 | A1 | | 2/2019 | |
| EP | 2177293 | A1 | | 4/2010 | |
| EP | 1568421 | B1 | | 12/2012 | |
| EP | 3088097 | A1 | | 11/2016 | |
| JP | S6049885 | A | | 3/1985 | |
| JP | H01237801 | A | | 9/1989 | |
| JP | H0439706 | A | * | 2/1992 | B21D 28/36 |
| JP | H0663659 | A | | 3/1994 | |
| JP | H0985694 | A | | 3/1994 | |
| JP | H099327 | A | | 4/1997 | |
| JP | 2000117472 | A | | 4/2000 | |
| JP | 2004283895 | A | | 10/2004 | |
| JP | 2011083788 | A | | 4/2011 | |
| JP | 2012096262 | A | | 5/2012 | |
| JP | 2013176807 | A | | 9/2013 | |
| JP | 5705265 | B2 | | 4/2015 | |
| JP | 6638043 | B1 | * | 1/2020 | B23K 37/00 |
| WO | 2015104071 | A1 | | 7/2015 | |
| WO | 2018224697 | A1 | | 12/2018 | |

* cited by examiner

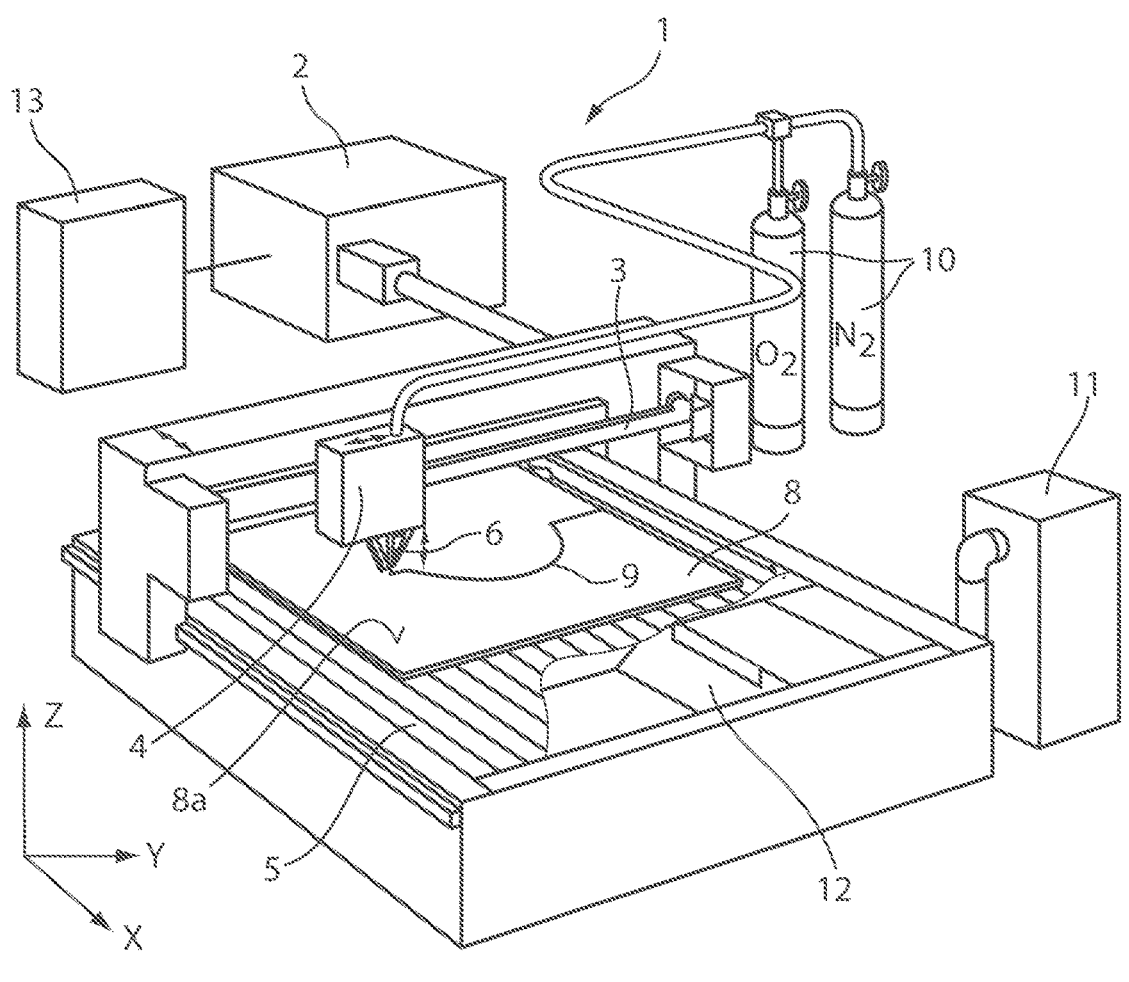
Fig. 1
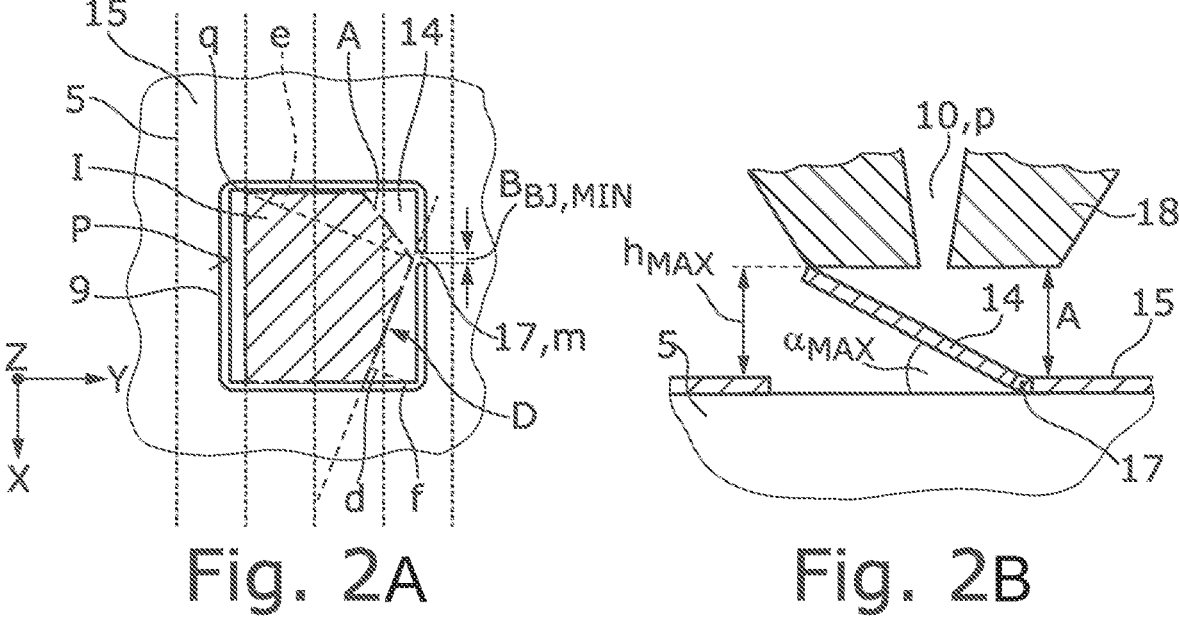
Fig. 2A                    Fig. 2B

METHOD FOR DETERMINING A MINIMUM WIDTH AND AN ATTACHMENT POSITION OF A MICROJOINT AND METHOD FOR MACHINING A WORKPIECE

CROSS-REFERENCE TO RELATED APPLICATION

This application is a continuation, under 35 U.S.C. § 120, of copending International Patent Application PCT/EP2021/061767, filed May 5, 2021, which designated the United States; this application also claims the priority, under 35 U.S.C. § 119, of German Patent Application DE 10 2020 205 680.3, filed May 6, 2020; the prior applications are herewith incorporated by reference in their entirety.

FIELD AND BACKGROUND OF THE INVENTION

The present invention relates to a method for determining a minimum width of a microjoint by which, when machining a workpiece, in particular a sheet-like workpiece, a workpiece part remains connected to a remaining workpiece of the workpiece. The invention also relates to a method for determining an attachment position of such a microjoint and also to a method for machining a workpiece, in particular a sheet-like workpiece, the method including: machining the workpiece while thereby forming at least one microjoint by which a workpiece part remains connected to a remaining workpiece.

Microjoints are retaining bars between workpiece parts and a remaining workpiece, sometimes also referred to below as the residual cut-out sheet. Microjoints are mainly set for example during the laser cutting or punching of workpieces, in particular sheet-like workpieces, in order to hold otherwise detached parts of the workpiece in the residual cut-out sheet in such a way that they do not become tilted, and for example in this way to prevent collisions between the machining head during the machining of the workpiece and the workpiece part. Microjoints also make it easier for the parts of the workpiece to be automatically unloaded together with the residual cut-out sheet.

The retaining bars or the microjoints are created by not cutting or punching the outer contour of the workpiece part right up to the end. Small retaining bars with a width of several tenths of a millimeter to a millimeter (so-called microjoints) are set by the programmer of the control program for the machine tool, for example a laser cutting system, either manually or by a control mechanism contained in the programming software. The size and the attachment position of the microjoint along the outer contour of the workpiece part must in this case usually be established by the programmer. It is mostly the case here that all of the microjoints that are set on a sheet-like workpiece are of the same width, irrespective of the conditions of the process, the properties of the workpiece part (weight, geometry), the material, etc.

This has the consequence that microjoints on small workpiece parts tend to be too wide and the small parts of the workpiece can consequently only be removed with difficulty from the residual cut-out sheet. In addition, the subsequent work necessary for removing the microjoints that are too wide is onerous. It is generally the case that: The wider the microjoint, the greater the subsequent work required to remove attachment marks at the cut or punched edge. On large workpiece parts, on the other hand, the microjoint set by the programmer may not be wide enough, and so the workpiece part is not securely held in the residual cut-off sheet and this may have the consequence of a collision between the tilted workpiece part and the machining head.

It is known from Japanese patent application JPH 0663659A to calculate the optimum width of a microjoint in dependence on the thickness of the workpiece, the length and physical properties of the material of the workpiece and also the surface area of the detached workpiece part. It is known from Japanese patent application JPH0439706A to read out an optimum microjoint width, dependent on the material and thickness of the workpiece, in an automated manner from a parameter database.

SUMMARY OF THE INVENTION

The invention is based on the object of providing a method for determining a minimum width of a microjoint, an attachment position of a microjoint and also a method for machining a workpiece with which the microjoint has an optimum width.

This object is achieved according to a first aspect by a method of the type mentioned at the beginning in which the minimum width of the microjoint is established in dependence on at least one machining parameter which influences a relative position of the workpiece part in relation to the remaining workpiece during the machining of the workpiece.

The inventors have realized that the determination of an optimized microjoint width requires that account is taken of not only parameters of the workpiece part or information concerning the workpiece part—as in JPH0663659A—but also machining parameters of a process or of a machining method in which the workpiece part is formed (typically cut or punched) or manipulated (for example displaced). The at least one machining parameter typically influences a relative position of the workpiece part in relation to the remaining workpiece during the machining of the workpiece. If the width of the microjoint is below the minimum permissible width, it is no longer possible for workpieces to be machined in a reliable process, since the workpiece part that is connected to the remaining workpiece by way of the microjoint may collide with components of a machine tool, for example with a machining nozzle, or possibly snag with the remaining workpiece.

The machining parameter may be for example the cutting gas pressure acting on the workpiece part during the laser cutting, the acceleration and/or static friction during the displacement of the workpiece part together with the remaining workpiece along a workpiece support, vibrations during combined punching/laser-machining of the workpiece, etc.

The minimum width of the microjoint is determined before the machining of the workpiece. The at least one machining parameter that influences the relative position is for example stored in a programming system for creating the control programs for machining workpiece parts, and is therefore known in advance, and so the minimum width of the microjoint can be determined before the machining of the workpiece.

Apart from the at least one machining parameter, the width of the microjoint is also established in dependence on items of information concerning the workpiece. The items of information concerning the workpiece may be the material of the workpiece, physical properties of the workpiece (for example the modulus of elasticity and the yield strength of the material), the occupancy (nesting) of the sheet-like workpiece with workpiece parts to be formed during the separating machining, items of information concerning the workpiece part, etc. Examples of items of information concerning the workpiece are: The geometry of the workpiece part, the weight of the workpiece part, the position of the workpiece part on the workpiece and also in relation to the supporting bars of the workpiece support (lying polygon), the force of the weight acting, etc.

It is possible on the basis of these items of information concerning the workpiece in the programming system for creating the control programs for cutting the parts of the workpiece to calculate the width of a microjoint in dependence on the distance of the microjoint from the center of gravity of the workpiece part in such a way that the microjoint prevents the workpiece part from becoming tilted with respect to the remaining workpiece due to the force of the weight. For this purpose, the moment acting at the microjoint due to the force of the weight of the workpiece part must not be so great as to exceed the yield strength of the microjoint.

It may be taken into account in the calculation that the microjoint is elastically and plastically deformed under the effect of the force of the workpiece part. The greater the width of the microjoint, the less the workpiece part typically tilts. The maximum permissible upstanding height of the workpiece part when it tilts in the case of a machine tool in the form of a laser cutting machine, for example, must be smaller than the distance between the machining nozzle of the laser cutting head and the workpiece. In practice, this distance usually lies in the range of values between 0.4 mm and 1 mm. The maximum permissible tilting angle $\alpha_{max}$ of the workpiece part can be calculated from this maximum permissible upstanding height and the geometry of the workpiece part. From the maximum tilting angle $\alpha_{max}$, it follows for the width $B_{MJ}$ of the microjoint that:

$$B_{MJ} \geq \sqrt[3]{\frac{1}{\alpha_{max}}}$$

The above calculation is sufficient if the end of cutting of the outer contour of the workpiece part lies at the microjoint, that is to say that the microjoint is formed by the (outer) contour not being cut completely to the end. In this case, at the location of the microjoint, the force of the cutting gas acting on the workpiece part at the end of cutting due to the gas pressure of the cutting gas leaving the machining nozzle plays only a minor role, since the workpiece part is held at this location by the microjoint.

In the case of a variant of the method described further above, the machining of the workpiece comprises thermal cutting of the workpiece with a machining beam, in particular with a laser beam, wherein the minimum width of the at least one microjoint is determined in dependence on a machining parameter in the form of a gas pressure of a cutting gas leaving a machining nozzle that acts on the workpiece part during the cutting free of the workpiece part from the remaining workpiece.

In the case of this variant, the gas stream typically acts on the workpiece part at a cutting-free position at a distance from the microjoint along the outer contour The cutting-free position is understood as meaning the position along the outer contour of the workpiece part at which the end of cutting lies. After reaching the cutting-free position, generally no further cutting machining takes place along the outer contour of the workpiece part.

If the microjoint is set at a location of the outer contour which does not correspond to the cutting-free position/the end of cutting, at the moment at which the outer contour is closed at the end of cutting the gas pressure of the cutting gas acts on the workpiece part at this cutting-free position. Depending on how the workpiece part is arranged in relation to the workpiece supporting elements (supporting bars, supporting slides, . . . ) to be supported, there may be regions of the outer contour at which the gas pressure of the cutting gas causes the workpiece part to become tilted at the cutting-free position.

In addition to the cutting gas pressure which acts on the workpiece part in a cutting-free position at a distance from the microjoint, account may also be taken of the cutting gas pressure that acts on the cut-free workpiece part during positioning movements of the cutting head or during the cutting of (closely) neighboring contours (in particular in the case of close nesting of workpiece parts). Irrespective of the positioning of the microjoint (at the end of cutting or at a position away from the end of cutting), the minimum width of the microjoint may therefore be determined, in addition or as an alternative to the variant described above, in dependence on a cutting gas pressure acting on the workpiece part as a result of a positioning movement of the cutting head passing over the workpiece part and/or on a cutting gas pressure acting on the workpiece part as a result of the cutting of a neighboring contour.

In a development, a minimum width of the microjoint at which a maximum upstanding height, by which the workpiece part stands up above the remaining workpiece, is not exceeded during a tilting of the workpiece part in relation to the remaining workpiece due to the effect of the gas pressure acting on the workpiece part. In this case, the (minimum) width of the microjoint is not so great that the upstanding height of the tilted workpiece part exceeds a predetermined maximum height.

In an advantageous development, the maximum upstanding height is not greater than a distance between the machining nozzle and the remaining workpiece, wherein the distance is preferably less than 2 mm, particularly preferably less than 1 mm. The minimum width of the microjoint is in this case determined such that a collision of the upstanding workpiece part with the machining nozzle of the laser cutting head is prevented. The distance is typically determined between the end face of the machining nozzle and the remaining workpiece.

In the case of a further variant, the machining of the workpiece contains a displacement of the remaining workpiece together with the workpiece part along a workpiece support, wherein the minimum width of the at least one microjoint is determined in dependence on at least one machining parameter in the form of an acceleration of the remaining workpiece during the displacement along at least one displacement direction. The acceleration along a respective displacement direction typically corresponds to an axial parameter of a drive of a machine tool which is configured to displace the remaining workpiece together with the workpiece part along the respective axial direction or displacement direction.

The workpiece support may have workpiece supporting elements, for example in the form of balls, brushes or the like, in order to reduce the friction during the displacement of the remaining workpiece with the workpiece part attached by way of the at least one microjoint along the workpiece support. Regions in which the workpiece or the workpiece part held by the microjoint is not supported generally exist between the workpiece supporting elements along the workpiece support. During the displacement of a workpiece part held by a microjoint on the workpiece support, such as takes place in the case of sheetmover machines (for example punching or punching/laser combination machines), the force of the weight acts on the workpiece part in the Z direction when the workpiece part passes over an unsupported region of the workpiece support. In addition, the workpiece part is bent in the X-Y plane about the microjoint. The minimum width of the microjoint is therefore also dictated by the requirement that the bending of the micro- joint does not become so much that the workpiece part slips under or over the remaining workpiece.

In the case of a further variant, a minimum width of the microjoint at which, during the displacement of the workpiece part together with the residual workpiece, a flexural stress at the microjoint does not exceed a maximum flexural stress is determined. The value for the maximum flexural stress is typically established in such a way that, during the displacement along the workpiece support, the workpiece part does not slip under or over the remaining workpiece.

Preferably, the maximum flexural stress at the microjoint is not greater than a yield strength of the material of the workpiece. Within the context of this application, the yield strength is understood as meaning the 0.2% yield stress $R_{p0,2}$ (elastic limit), since this (unlike the yield strength) can always be clearly ascertained from the nominal stress-total strain diagram. If the yield strength of the material of the workpiece is exceeded, the microjoint is plastically deformed during the bending, and so the workpiece part typically remains permanently in a tilted position in relation to the remaining workpiece.

In a further development of this variant, the minimum width of the microjoint is made up of the minimum width of the microjoint at which the maximum flexural stress is not exceeded and a safety factor, wherein the safety factor is preferably dependent on the minimum width of the micro- joint at which the maximum flexural stress is not exceeded. In this development, an empirically ascertained safety fac- tor, which takes into account the influence of external disturbances, such as for example vibrations during the punching process, sag of the workpiece part, deflection of the workpiece part when it passes over supporting elements (for example balls or brushes), is added to the calculated minimum width of the microjoint. Furthermore, the safety factor may take into account the notch effect occurring at the attachment position of the microjoint as a result of the abrupt reduction in diameter, which leads to a reduction in the maximum permissible flexural stress. The safety factor is in this case ideally dependent on the calculated width of the microjoint, i.e. it is not an absolute value. In this way, the calculated minimum microjoint widths for the different workpiece parts of a workpiece change relatively and not absolutely, which prevents small workpiece parts from being attached by an over-dimensioned microjoint.

A further aspect of the invention relates to a method for determining an attachment position of a microjoint by which a workpiece part remains connected to a remaining work- piece of a workpiece, in particular a sheet-like workpiece, comprising: determining a minimum width of the microjoint in the case of multiple different attachment positions along an outer contour of the workpiece part, wherein the mini- mum width is determined according to the method described further above, and also selecting the attachment position along the outer contour for the machining of the workpiece for which the smallest minimum width of the microjoint has been determined. The determination described further above of the minimum width of the microjoint is in this case carried out for different attachment positions along the outer contour, in order to ascertain at which location or at which attachment position the microjoint would assume the small- est width. In the programming system for creating the control program for the machine tool, this location may be automatically selected as the attachment position of the microjoint.

A further aspect of the invention relates to a method of the type stated at the beginning for machining a workpiece, in particular a sheet-like workpiece, in which the at least one microjoint is formed at an attachment position along an outer contour of the workpiece part which has been deter- mined according to the method described further above for determining the attachment position. As described further above, an attachment position along the outer contour at which the microjoint has a minimum width is chosen.

The invention also relates to a computer program product which is designed for carrying out all of the steps of the method described above when the computer program runs on a data processing system. The data processing system may be in particular a programming system, i.e. a computer for programming the control programs for a numerical control device of a machine tool, for example for cutting- machining and/or for transporting a workpiece or a machine- based arrangement with such a machine tool. When the computer program is running in the programming system, a machining program which includes a sequence of (control) commands for machining the workpiece is created. The machining program thus created can subsequently be per- formed by a numerical control device of the machine tool or a machine-based arrangement containing this machine tool.

Other features which are considered as characteristic for the invention are set forth in the appended claims.

Although the invention is illustrated and described herein as embodied in a method for determining a minimum width and an attachment position of a microjoint and a method for machining a workpiece, it is nevertheless not intended to be limited to the details shown, since various modifications and structural changes may be made therein without departing from the spirit of the invention and within the scope and range of equivalents of the claims.

The construction and method of operation of the inven- tion, however, together with additional objects and advan- tages thereof will be best understood from the following description of specific embodiments when read in connec- tion with the accompanying drawings.

BRIEF DESCRIPTION OF THE FIGURES

FIG. 1 is a diagrammatic, perspective view of a machine tool in the form of a laser cutting machine for the separating machining of a sheet-like workpiece according to the inven- tion;

FIGS. 2A and 2B are sectional views of a workpiece part which is connected to a remaining workpiece by way of a microjoint, during the tilting as a result of a gas pressure of a cutting gas;

DETAILED DESCRIPTION OF THE INVENTION

Figure 3:
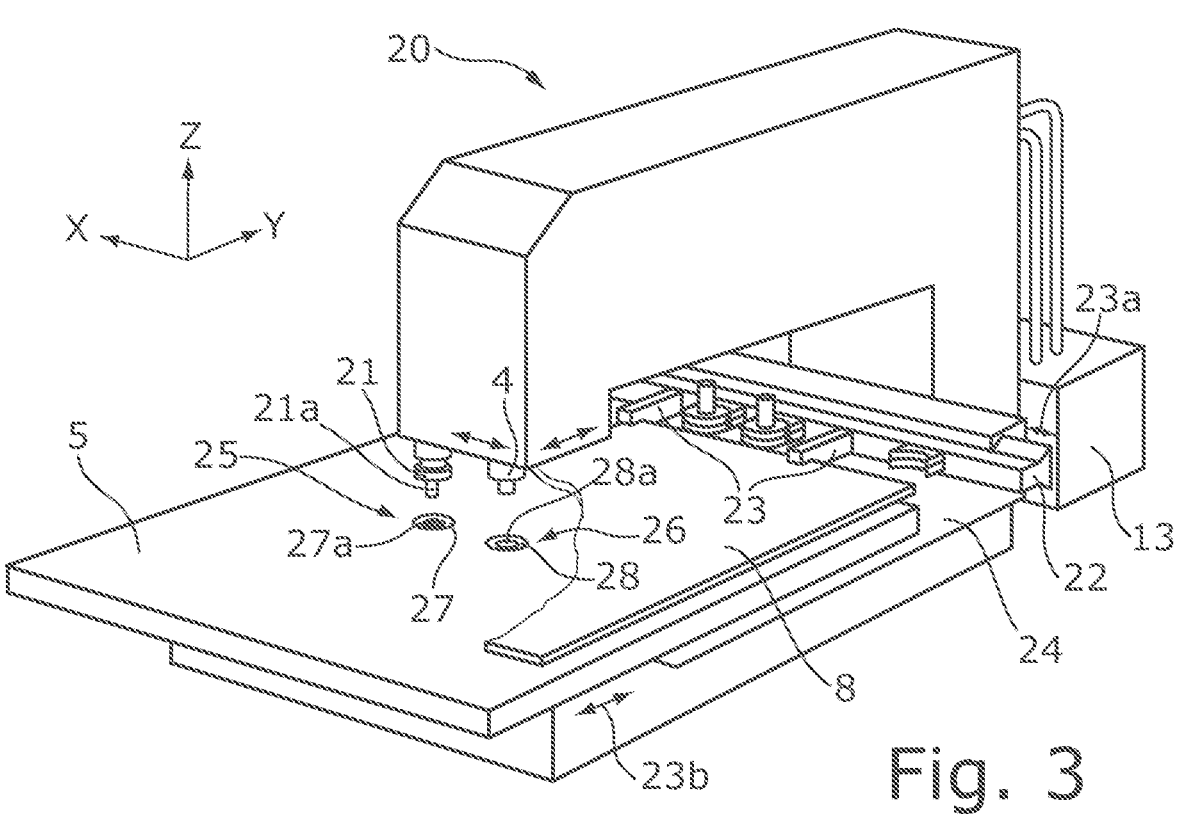
FIG. 3 is a perspective view of the machine tool in a form of a combined laser and punching machine.

In the following description of the drawings, identical reference signs are used for identical or functionally iden- tical components.

Referring now to the figures of the drawings in detail and first, particularly to FIG. 1 thereof, there is shown a $CO_2$ laser cutting machine 1 for laser cutting with a $CO_2$ laser resonator 2, a laser machining head 4 and a workpiece support 5. A laser beam 6 generated by the laser resonator 2 is guided by means of a beam guide 3 from deflecting mirrors (not shown) to the laser machining head 4 and focused therein and also aligned with the aid of mirrors that are likewise not depicted perpendicularly to a surface 8a of the workpiece 8, i.e. the beam axis (optical axis) of the laser beam 6 extends perpendicularly to the workpiece 8.

For the laser cutting of the workpiece 8, first the laser beam 6 is used for piercing, i.e. the workpiece 8 is melted or oxidized at a location in the form of a point and the melt thereby produced is blown out. After that, the laser beam 6 is moved over the workpiece 8, so as to form a continuous kerf 9, along which the laser beam 6 cuts through the workpiece 8.

Both the piercing and the laser cutting can be assisted by adding a gas. Oxygen, nitrogen, compressed air and/or application-specific gases may be used as cutting gases 10. Which gas is ultimately used is dependent on which materials are being cut and which quality requirements the workpiece 8 has to meet. Particles and gases produced can be suctioned off with the aid of a suction device 11 from a suction chamber 12. A schematically represented programmable numerical control device 13 controls all of the essential functions of the laser cutting machine 1, for example the movement of the laser machining head 4, when a machining program is performed on it.

FIGS. 2A and 2B show the separating machining of the workpiece 8, to be more precise a rectangular workpiece part 14, which is separated from a remaining workpiece 15 (residual cut-out sheet) along a cutting contour 9. During the separating machining, the workpiece part 14 remains connected to the remaining workpiece 15 at its outer contour P by way of a microjoint 17. In the case of the example shown in FIGS. 2A, 2B, the microjoint 17 is at a microjoint position m along the outer contour P in the XY plane (the plane of the workpiece) which does not correspond to a cutting-free position f along the outer contour P that forms the end of the cutting during the separating machining along the cutting contour 9. At the moment at which the cutting contour 9 is closed at the cutting-free position f, a gas pressure p of the cutting gas 10 that leaves a machining nozzle 18 of the laser cutting machine 1 acts on the workpiece part 14 (cf. FIG. 2B).

If the laser cutting head 4 or the active area of the cutting gas nozzle 18 that is subjected to pressure (cf. FIG. 2B) is moved once again over a region of the workpiece part 14 connected by a microjoint 17, the microjoint 17 should attach the workpiece part 14 specifically in this region. In this way, the force introduced by the gas pressure p has the smallest lever with respect to the microjoint 17, and consequently also creates the smallest stresses.

Depending on how the workpiece part 14 is arranged in relation to the supporting workpiece supporting elements 5, there may be regions along the cutting contour 9 or along the outer contour P of the workpiece part 14 at which the gas pressure p of the cutting gas 10 causes the workpiece part 14 to become tilted in relation to the remaining workpiece 15 at the cutting-free position f.

In this case, the width $B_{MJ}$ of the microjoint 17 must not go below a minimum width $B_{MJ,min}$ at which the upstanding height of the tilted workpiece part 14 reaches a predetermined maximum upstanding height $h_{max}$, shown in FIG. 2B. In the example shown in FIGS. 2A, 2B, the maximum upstanding height $h_{max}$ coincides with the distance A between the machining nozzle 18 and the remaining workpiece 15 or the workpiece 8. By specifying the maximum upstanding height $h_{max}$ as such, a collision of the upstanding workpiece part 14 with the machining nozzle 18 of the laser cutting head 4 can be prevented. In the example shown, the distance A between the end face of the machining nozzle 18 and the upper side 8a of the workpiece 8 is less than about 2 mm, generally 1 mm or less.

The calculation or the determination of the minimum microjoint width $B_{MJ,min}$ that the width of the microjoint must not go below in order to prevent a collision of the upstanding workpiece part 14 with the machining nozzle 18 is carried out in the case of the example shown in FIG. 2A, 2B as shown below.

The configuration of supporting bars S refers to the set of all points in the XY plane that are given by the tips of the supporting bars 5, which are represented in FIG. 2A by dotted lines extending in the X direction. Also given are the outer contour P to be cut of the workpiece part 14, the microjoint position m and the cutting-free position f along the outer contour P to be cut.

The region I, hatched in FIG. 2A, represents the cut set of the interior of the outer contour P with the configuration of supporting bars S, combined with the microjoint position m. The supporting polygon A, represented by dashed-dotted lines, represents the convex envelope of I. D denotes the side of the supporting polygon A that is arranged closest to the cutting-free position f. The distance between the side D and the cutting-free position f is denoted by d. The distance between a position q, which lies on the other side of D with respect to the cutting-free position f and is at the greatest distance from D, and D is denoted by e. The force acting on the interior of the outer contour P at the cutting-free position f, produced by the gas pressure p of the cutting gas 10 leaving the machining nozzle 18, is designated hereinafter by F.

On the basis of the variables described above, the minimum width $B_{BJ,min}$ of the microjoint 17 can be determined: If the force F induced by the gas pressure p and described further above acts on the cut-free workpiece part 14, the latter tilts about the axis D.

In first approximation, the tilting angle $\alpha$ of the workpiece part 14 about the axis D is directly proportional to F*d, and so, with a material-dependent constant $c_0$, it is the case that the maximum tilting angle $\alpha_{max}$ in degrees is W(P,S,f,m) =max(90; $c_0$*F*d).

It has also been ascertained experimentally that $1/\alpha$ is directly proportional to the third power of the width $B_{MJ}$ of the microjoint 17 at the microjoint position m. Consequently, for a material-dependent constant c:

$$W(P,S,f,m)=\max(90;c*F*d/B_{MJ}^{3}),$$

where $B_{MJ}$ denotes the width of the microjoint 17 at the point m.

For a given tilting angle $\alpha$, according to the invention it should be ensured that the upstanding height $$H(P,\alpha)=\sin(\alpha)e$$

is less than a predetermined value h, which is allowed as the maximum tilting height $h_{max}$, that is to say that $$H(P,\alpha)<h_{max}.$$

This condition is satisfied if $$\sin(\alpha)e<h_{max}, \text{ that is to say}$$

$$(\sin(W(P,S,p,m))e<h_{max}, \text{ that is to say}$$

$$(\sin(\max(90; c*F*d/B_{MJ}{}^3))) e < h_{max}.$$

If $e < h_{max}$, that is to say that in principle the workpiece part 14 may stand up too high, the following is therefore obtained as a condition:

$$\sin(c*F*d/B_{MJ}{}^3) < h_{Max}/e, \text{ which applies specifically whenever}$$

$$c*F*d/B_{MJ}{}^3 < \text{arCsin}(h_{Max}/e), \text{ which applies specifically whenever}$$

$$B_{MJ} > \sqrt[3]{cFd/\arcsin\left(\frac{h_{max}}{e}\right)}$$

The width $B_{MJ}$ of the microjoint 17, and consequently the minimum width $B_{MJ,min}$ of the microjoint 17, is specified by this inequation.

The minimum width $B_{MJ,min}$ of the microjoint 17, which has been determined in the way described further above, is used in a programming system for creating a control program for machining the workpiece 8 in order to create a machining program which runs on the numerical control device 13 during the machining of the workpiece 8.

The minimum width $B_{MJ,min}$ of the microjoint 17 may be determined not only in dependence on the cutting gas pressure p as a machining parameter but also in dependence on other machining parameters that influence a relative position of the workpiece part 14 with respect to the remaining workpiece 15 during the machining of the workpiece 8. This is the case for example during the manipulation, to be more precise the displacement, of a workpiece 8, as described below on the basis of a combined laser and punching machine 20, which is represented in FIG. 3.

The machine tool 20 configured as a laser and punching machine has as machining tools for the separating machining of the sheet-like workpiece 8 in the form of a metal sheet a conventional punching head 21 with a punch 21a and a laser machining head 4. The workpiece 8 to be machined is mounted on a workpiece support 5 in the form of a machining table during the machining of the workpiece. By means of a conventional holding device 22, which has clamps 23 for securely holding the workpiece 8, the workpiece 8 can be displaced with respect to the punch 21a and the laser machining head 4 in the X direction of the plane of the workpiece (XY plane of an XYZ coordinates system) by means of a conventional linear drive 23a, indicated by an arrow. The workpiece 8 can be moved in the Y direction of the plane of the workpiece by the workpiece support 5 being displaced together with the holding device 22 relative to a substrate 24, on which the workpiece support 5 is mounted, by means of a conventional linear drive 23b, indicated by an arrow.

The workpiece 8 can in this way be displaced in the X and Y directions with respect to the punch 21a and the laser machining head 4, and so the region of the workpiece 8 that is to be machined in each case can be positioned in a fixed machining region 25 of the punch 21a or a fixed machining region 26 of the laser machining head 4. Positioned in the machining region 25 of the punch 21 is an (interchangeable) punching die 27, which has an opening 27a for the engagement of the (likewise interchangeable) punch 21a. Correspondingly arranged in the fixed machining region 26 of the laser machining head 4 is a laser die 28, which serves as an opening delimitation for a substantially circular suction opening 26a in the workpiece support 5. The subregion of the workpiece support 5 in the X direction at which the machining regions 25, 26 are formed is fixed here, and is not displaced in the Y direction in relation to the substrate 24. The laser machining head 4 may thereby perform a movement in the X and Y directions that is limited by the suction opening 26a. The machine tool 20 shown in FIG. 3 has a control device 13, which serves for controlling the linear drives 23a, 23b in the X direction and in the Y direction of the machine tool 20.

Figures 4A, 4B:
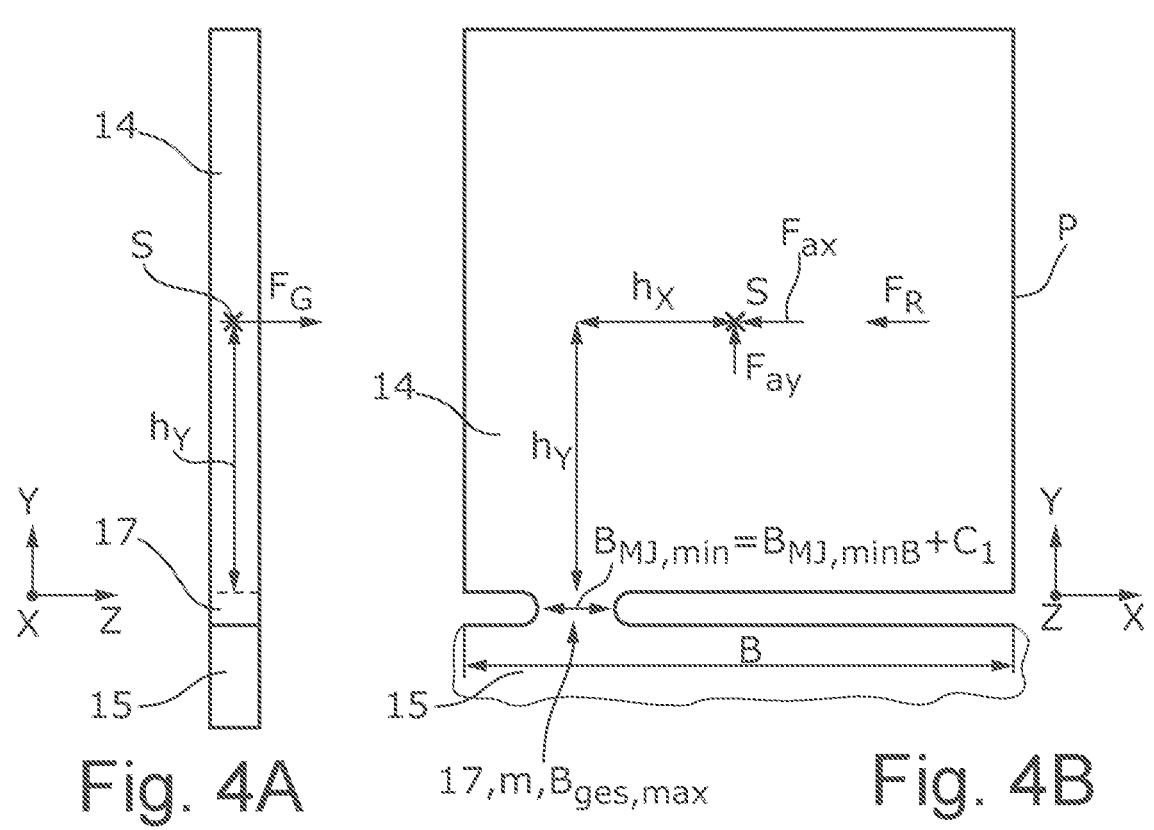
FIGS. 4A and 4B are representations of the workpiece part which is connected to a remaining workpiece by way of a microjoint, during the displacement along a workpiece support.

FIGS. 4A, 4B show a workpiece part 14, which is held on a remaining workpiece 15 by way of a microjoint 17. During the displacement of the workpiece part 14 held by the microjoint 17 on or along the workpiece support 5 in the X direction, the force of the weight $F_G$ acts on the workpiece part 14 in the Z direction when the workpiece part 14 passes over an unsupported region of the workpiece support 5. In addition, the workpiece part 14 is bent in the XY plane about the microjoint 17. The minimum width $B_{BJ,min}$ of the microjoint 17 is therefore also dictated by the requirement that the bending does not become so much that the workpiece part 14 slips under or over the remaining workpiece 15.

The calculation of the minimum microjoint width $B_{BJ,min}$ is dependent on the position m of the microjoint on the workpiece part 14.

The microjoint 17 is advantageously attached to the workpiece part 14 at a location (microjoint position or attachment position m) at which the main axis of inertia of the workpiece part 14 intersects with the outer contour P (for example at an axis of symmetry of the workpiece part 14—as a departure from the representation shown in FIG. 4A, 4B). In this way, there is no longer any torsional loading of the microjoint 17 by the force of the weight $F_G$. If the microjoint 17 is additionally at a position m along the outer contour P obtained by projection of the center of gravity S of the workpiece part 14 in the direction of the relative movement between the workpiece part 14 and the workpiece support 5, there is no longer any further flexural loading by the acceleration force and friction force in a second axial direction.

Moreover, the microjoint 17 should be attached at the point of intersection of the main axis of inertia with the outer contour P that is at the smallest distance from the center of gravity S of the workpiece 14, or in the axial direction (X or Y) in which the greatest acceleration acts on the workpiece part 14.

The following assumptions apply for the interpretation described below of the minimum necessary microjoint width $B_{BJ,min}$:

Acting in the Z direction is the force of the weight $F_G$ of the workpiece part 14 that acts at the center of mass (center of gravity S).

Acting on the microjoint 17 in the X and Y directions are an (axial) acceleration $a_x$, $a_y$ and a static friction.

The forces act at the center of gravity S; in this case, a small lever (=distance between center of gravity S and attachment position m of the microjoint 17) is favorable. This establishes the preferred attachment position m of the microjoint 17 on the workpiece 14.

The microjoint 17 lies on one of the main axes of inertia. During the laser cutting, the microjoint 17 is set at the end of the cutting, and so the gas pressure plays a secondary role and can be ignored.

The following variables are required for the calculation of the minimum necessary microjoint width $B_{BJ,min}$ on the basis of the following assumptions:

geometrical properties of the workpiece 14:
center of gravity S of the workpiece part 14 attachment point m of the microjoint 17: optimally lies on one of the main axes of inertia of the workpiece part 14, which corresponds to a respective axis of symmetry of the workpiece part 14 (if present)

material properties:

sheet thickness d permissible stress $B_{ges}$ modulus of elasticity density (weight or mass m)

friction value or friction coefficient µ with the workpiece support 5 axial parameters of the machine tool 20:

acceleration $a_x$, $a_Y$ in the X and Y directions.

The microjoint 17 is assumed hereinafter as a bending beam on which the following moments act:

moment in the direction of gravitational force (about the X axis):

$$M_x=F_G*h_y \text{ with } F_G=m*g$$

moment in the X and Y directions (about the Z axis):

$$M_z=(F_{ax}+F_R)*h_y+(F_{ay}+F_R)*h_x \text{ with}$$

$$F_{ax}=m*a_x \text{ and } F_{ay}=m*a_y \text{ and } F_R=F_G*µ,$$

With the following designations: m=mass of the workpiece part, g=acceleration due to gravity $h_x$=distance between center of gravity S and the attachment point m of the microjoint 17 in the X direction, $h_y$=distance between center of gravity S and the attachment point m of the microjoint in the Y direction, $a_x$=acceleration in the X direction, $a_y$=acceleration in the Y direction, µ=friction coefficient between the material of the workpiece part 14 and the workpiece support 5.

In the case of the example shown in FIGS. 4A, 4B, in which the workpiece part 14 is only displaced in the X direction, there is no longer the friction force $F_R$ in the Y direction. The moment about the Y axis no longer occurs as a result of the simplification that the microjoint 17 lies on one of the main axes of inertia.

Determination of the moment of resistance $W_X$, $W_Y$ of the microjoint 17:

$$W_x=I_x/(d/2) \text{ with } I_x=(B_{MJ}*d^3)/12$$

$$W_z=I_z/(B_{MJ}/2) \text{ with } I_z=(d*B_{MJ}{}^3)/12$$

(D=workpiece thickness, $B_{MJ}$=microjoint width)

This allows the flexural stress $B_{ges}$ on the microjoint 17 to be calculated:

$$B_x=M_x/W_x$$

$$B_z=M_z/W_z$$

$$\Rightarrow B_{ges}=B_x+B_z \text{ (vectorial addition)}.$$

The microjoint width $B_{BJ}$ must be chosen such that the flexural stress $B_{ges}$ is at most as great as the yield strength $R_{p0.2}$ for the material of the currently displaced workpiece 8:

$$B_{ges,max} \leq R_{p0.2}$$

The minimum microjoint width $B_{MJ,minB}$ is then calculated for this predetermined limit value $R_{p0.2}$ of the stress $B_{ges,max}$ as follows:

$$B_{mj1,2}=\frac{-b \pm \sqrt{b^2-4ac}}{2a} \text{ with}$$

-continued $$a=-R_{p0,2}; b=\frac{6|h_y| \cdot F_G}{d^2}; c=\frac{6(|h_x| \cdot F_{ay}+|h_y| \cdot (F_{ax}+F_R))}{d}$$

and finally:

$$B_{MJ,minB}=\max\{B_{MJ1},B_{MJ2}\}$$

The minimum microjoint width $B_{BJ,minB}$ is the maximum of the two values $B_{MJ1}$, $B_{MJ2}$, because the smaller of the two values is always negative as a result of the root used in the calculation.

An empirically ascertained safety factor $c_1$, which takes into account the influence of external disturbances, such as for example vibrations during the punching process, sag of the workpiece part 14, deflection of the workpiece part 14 when it passes over supporting elements (for example balls or brushes), may be added to the calculated minimum microjoint width $B_{BJ,minB}$, i.e. $B_{BJ,min}=B_{BJ,minB}+c_1$.

Furthermore, the safety factor $c_1$ may take into account the notch effect occurring at the attachment position m of the microjoint 17 as a result of the abrupt reduction in diameter, which leads to a reduction in the maximum permissible flexural stress $B_{ges,max}$. The safety factor $c_1$ is in this case ideally dependent on the calculated microjoint width ($c_1$ ($B_{BJ,minB}$)), i.e. it is not an absolute value. In this way, the calculated minimum microjoint widths $B_{BJ,min}$ for the different workpiece parts 14 of a workpiece 4 change relatively and not absolutely, which prevents small workpiece parts 14 from being attached by an overdimensioned microjoint 17.

Both the method described in connection with FIGS. 2A, 2B and the method described in connection with FIGS. 4A, 4B for determining the minimum width $B_{BJ,min}$ of the microjoint 17 are typically carried out for a number of different attachment positions m along the outer contour P of the workpiece part 14. The attachment position m along the outer contour P for which the smallest minimum width $B_{BJ,min}$ of the microjoint 17 has been determined is selected for the machining of the workpiece 8. During the subsequent machining of the workpiece 8, the at least one microjoint 17 by which the workpiece part 14 remains connected to the remaining workpiece 15 is formed at the attachment position m selected in the way described above and with the minimum width $B_{BJ,min}$ determined in the way described further above.

The minimum width $B_{BJ,min}$ and the attachment position m of the microjoint 17 are used in a programming system for creating a control program or for creating control commands for machining the workpiece 8. The control program created in this way is executed by the control device 13 during the machining of the workpiece 8. Stored in the programming system are items of information concerning the workpiece and machining parameters for the machining of the workpiece 8 that are required for the determination of the minimum width $B_{BJ,min}$ of the microjoint 17, for example the cutting gas pressure p during the cutting-machining of the workpiece 8 or the axial accelerations $a_x$, $a_Y$ during the displacement of the workpiece 8 along the workpiece support 5. It goes without saying that, as an alternative or in addition to the machining parameters described further above, other machine parameters that influence the relative position of the workpiece part 14 connected to the remaining workpiece 15 by way of the (at least one) microjoint 17 with respect to the remaining workpiece 15 or with respect to the workpiece support 5 may be used for the determination of the minimum width $B_{BJ,min}$ of the microjoint 17.

The invention claimed is:

1. A method for determining a minimum width of a microjoint by which, when machining a workpiece, a workpiece part remains connected to a remaining workpiece of the workpiece, which comprises:

determining the minimum width of the microjoint in dependence on at least one machining parameter which influences a relative position of the workpiece part in relation to the remaining workpiece during the machining of the workpiece, wherein the machining of the workpiece includes thermal cutting of the workpiece with a machining beam;

wherein the minimum width of the microjoint is determined in dependence on the at least one machining parameter in a form of a gas pressure of a cutting gas leaving a machining nozzle that acts on the workpiece part during a cutting free of the workpiece part from the remaining workpiece.

2. The method according to claim 1, wherein the minimum width of the microjoint at which a maximum upstanding height, by which the workpiece part stands up above the remaining workpiece, is not exceeded during a tilting of the workpiece part in relation to the remaining workpiece due to an effect of the gas pressure acting on the workpiece part.

3. The method according to claim 2, wherein the maximum upstanding height is not greater than a distance between the machining nozzle and the remaining workpiece, wherein the distance is less than 2 mm.

4. The method according to claim 1, wherein the workpiece is a sheet-shaped workpiece.

5. The method according to claim 1, wherein the machining beam is a laser beam.

6. The method according to claim 3, wherein the distance is less than 1 mm.

7. A method for determining a minimum width of a microjoint by which, when machining a workpiece, a workpiece part remains connected to a remaining workpiece of the workpiece, which comprises:

determining the minimum width of the microjoint in dependence on at least one machining parameter which influences a relative position of the workpiece part in relation to the remaining workpiece during the machining of the workpiece, wherein the machining of the workpiece includes a displacement of the remaining workpiece together with the workpiece part along a workpiece support, wherein the minimum width of the microjoint is determined in dependence on the at least one machining parameter in a form of an acceleration of the workpiece part during the displacement along at least one displacement direction.

8. The method according to claim 7, wherein the minimum width of the microjoint at which, during the displacement of the workpiece part together with the remaining workpiece, a flexural stress at the microjoint that does not exceed a maximum flexural stress is determined.

9. The method according to claim 8, wherein the maximum flexural stress at the microjoint is not greater than a yield strength of a material of the workpiece.

10. The method according to claim 8, wherein the minimum width of the microjoint is made up of the minimum width of the microjoint at which the maximum flexural stress is not exceeded and a safety factor.

11. The method according to claim 10, wherein the safety factor dependent on the minimum width of the microjoint at which the maximum flexural stress is not exceeded.

12. A method for determining an attachment position of a microjoint by which a workpiece part remains connected to a remaining workpiece when machining a workpiece, which comprises the step of:

determining a minimum width of the microjoint in a case of multiple different attachment positions along an outer contour of the workpiece part, wherein the minimum width is determined by the method according to claim 1; and selecting an attachment position along the outer contour for the machining of the workpiece for which a smallest minimum width of the microjoint has been determined.

13. A method for machining a workpiece, which comprises the steps of:

machining the workpiece while thereby forming at least one microjoint by which a workpiece part remains connected to a remaining workpiece, the at least one microjoint is formed at an attachment position along an outer contour of the workpiece part, the attachment position is selected along the outer contour for the machining of the workpiece for which a minimum width of the microjoint has been determined by the method according to claim 1.

14. A non-transitory computer program readable storage medium having computer executable instructions for carrying out all of the steps of the method according to claim 1 when the computer program runs on a data processing system.

* * * * *